(12) United States Patent
Shinozaki (10) Patent No.: US 10,239,375 B2
(45) Date of Patent: Mar. 26, 2019

(54) VEHICLE CHASSIS LEVEL SENSOR

(71) Applicant: BOURNS, INC., Riverside, CA (US)

(72) Inventor: David Shinozaki, Lake Orion, MI (US)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 15/549,082

(22) PCT Filed: Feb. 8, 2016

(86) PCT No.: PCT/US2016/016951
§ 371 (c)(1),
(2) Date: Aug. 4, 2017

(87) PCT Pub. No.: WO2016/127161
PCT Pub. Date: Aug. 11, 2016

(65) Prior Publication Data
US 2018/0037078 A1  Feb. 8, 2018

Related U.S. Application Data

(60) Provisional application No. 62/112,743, filed on Feb. 6, 2015.

(51) Int. Cl.
*B60G 11/14* (2006.01)
*B60G 11/16* (2006.01)
(Continued)

(52) U.S. Cl.
CPC ............... *B60G 11/14* (2013.01); *B60G 3/06* (2013.01); *B60G 11/16* (2013.01); *B60G 15/063* (2013.01);
(Continued)

(58) Field of Classification Search
CPC ........ B60G 11/14; B60G 3/06; B60G 17/019; B60G 2200/142; B60G 2202/12
See application file for complete search history.

(56) References Cited

U.S. PATENT DOCUMENTS 4,181,835 A   1/1980  Stadler et al.
4,377,090 A   3/1983  Seulen
(Continued)

FOREIGN PATENT DOCUMENTS

DE          3510252 A1    9/1986
DE     102010038541 A1    2/2012
(Continued)

OTHER PUBLICATIONS

International Preliminary Report on Patentability for Application No. PCT/US2016/016951 dated Apr. 29, 2016 (10 pages).
(Continued)

*Primary Examiner* — Faye M Fleming
(74) *Attorney, Agent, or Firm* — Michael Best & Friedrich LLP (57) ABSTRACT

A damper assembly for a vehicle having a chassis and a control arm moveably coupled to the chassis includes a first spring seat configured to be fixed to the chassis, a second spring seat configured to be supported by the control arm, a coil spring extending between the first spring seat and the second spring seat, and a sensor module supported by the first spring seat or the second spring seat. The sensor module is operable to determine a state of compression of the coil spring.

20 Claims, 6 Drawing Sheets

(51) Int. Cl.
  *B60G 15/06* (2006.01)
  *B60G 17/019* (2006.01)
  *F16F 9/32* (2006.01)
  *B60G 3/06* (2006.01)
  *F16F 1/12* (2006.01)

(52) U.S. Cl.
  CPC ......... *B60G 15/067* (2013.01); *B60G 17/019* (2013.01); *F16F 1/12* (2013.01); *F16F 9/32* (2013.01); *B60G 2200/142* (2013.01); *B60G 2202/12* (2013.01); *B60G 2204/11* (2013.01); *B60G 2204/124* (2013.01); *B60G 2401/172* (2013.01)

(56) References Cited

U.S. PATENT DOCUMENTS

| | | | |
|---|---|---|---|
| 4,612,502 A | | 9/1986 | Spies |
| 4,776,610 A | | 10/1988 | Moog |
| 5,242,190 A | * | 9/1993 | Morris .............. B60G 17/019 280/5.503 |
| 5,390,949 A | * | 2/1995 | Naganathan .......... B60G 11/48 267/162 |
| 5,521,497 A | | 5/1996 | Schneider et al. |
| 5,998,990 A | | 12/1999 | Andermo et al. |
| 7,999,535 B2 | | 8/2011 | Dietz et al. |
| 8,180,585 B2 | | 5/2012 | Cech et al. |
| 8,614,518 B2 | | 12/2013 | Li et al. |
| 8,803,513 B2 | | 8/2014 | Hosek et al. |
| 2004/0100057 A1 | | 5/2004 | Nicot et al. |
| 2005/0077691 A1 | | 4/2005 | Witters |
| 2007/0120333 A1 | | 5/2007 | Bushko |
| 2008/0099967 A1 | | 5/2008 | Spratte et al. |
| 2012/0032668 A1 | | 2/2012 | Hayashi |
| 2012/0160621 A1 | | 6/2012 | Battlogg et al. |
| 2012/0248665 A1 | | 10/2012 | Encia et al. |
| 2013/0154621 A1 | | 6/2013 | Moenkemoeller |

FOREIGN PATENT DOCUMENTS

| | | |
|---|---|---|
| EP | 1980427 | 10/2008 |
| GB | 2430750 | 4/2007 |
| JP | S608104 A | 1/1985 |
| WO | WO2014/145018 | 9/2014 |
| WO | WO2016/127161 | 8/2016 |

OTHER PUBLICATIONS

International Search Report and Written Opinion for Application No. PCT/US2016/016951 dated Feb. 8, 2016 (13 pages).
European Search Report and Search Opinion for Application No. 167474105 dated Sep. 21, 2018 (10 pages).

* cited by examiner

VEHICLE CHASSIS LEVEL SENSOR

CROSS-REFERENCE TO RELATED APPLICATIONS

This application claims priority to U.S. Provisional Patent Application No. 62/112,743, filed Feb. 6, 2015, the entire contents of which are incorporated by reference herein.

BACKGROUND

Embodiments of the invention relate to vehicle suspensions and, more particularly, to sensors for vehicle suspensions.

A vehicle suspension allows movement between wheels and a chassis, or frame, of a vehicle. Suspensions typically include springs, shocks, struts, or other elements to dampen this relative movement. Some suspensions also include sensors to measure the amount of relative movement between the wheels and the chassis.

SUMMARY

In one embodiment, the invention provides a damper assembly for a vehicle. The vehicle has a chassis and a control arm moveably coupled to the chassis. The damper assembly includes a first spring seat configured to be fixed to the chassis, a second spring seat configured to be supported by the control arm, a coil spring extending between the first spring seat and the second spring seat, and a sensor module supported by the first spring seat or the second spring seat. The sensor module is operable to determine a state of compression of the coil spring.

In another embodiment, the invention provides a suspension system for a vehicle. The suspension system includes a first control arm configured to be pivotally coupled to a chassis of the vehicle, a second control arm configured to be pivotally coupled to the chassis of the vehicle, a first wheel hub supported by the first control arm, and a second wheel hub supported by the second control arm. The suspension system also includes a damper assembly having a first spring seat configured to be fixed to the chassis of the vehicle, a second spring seat supported by the control arm, a coil spring extending between the first spring seat and the second spring seat, and a sensor module supported by the first spring seat or the second spring seat. The sensor module is operable to determine a state of compression of the coil spring.

In yet another embodiment, the invention provides a sensing system that measures compression of a vehicle coil spring. The sensing system includes a housing configured to be coupled to an end of the coil spring, and a permanent magnet supported by the housing. The permanent magnet has a magnetic field that interacts with a coil of the coil spring. The sensing system also includes a magnetic sensor supported by the housing. The magnetic sensor is operable to sense the magnetic field from the permanent magnet. The magnetic field at the magnetic sensor changes when the compression of the coil spring changes.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
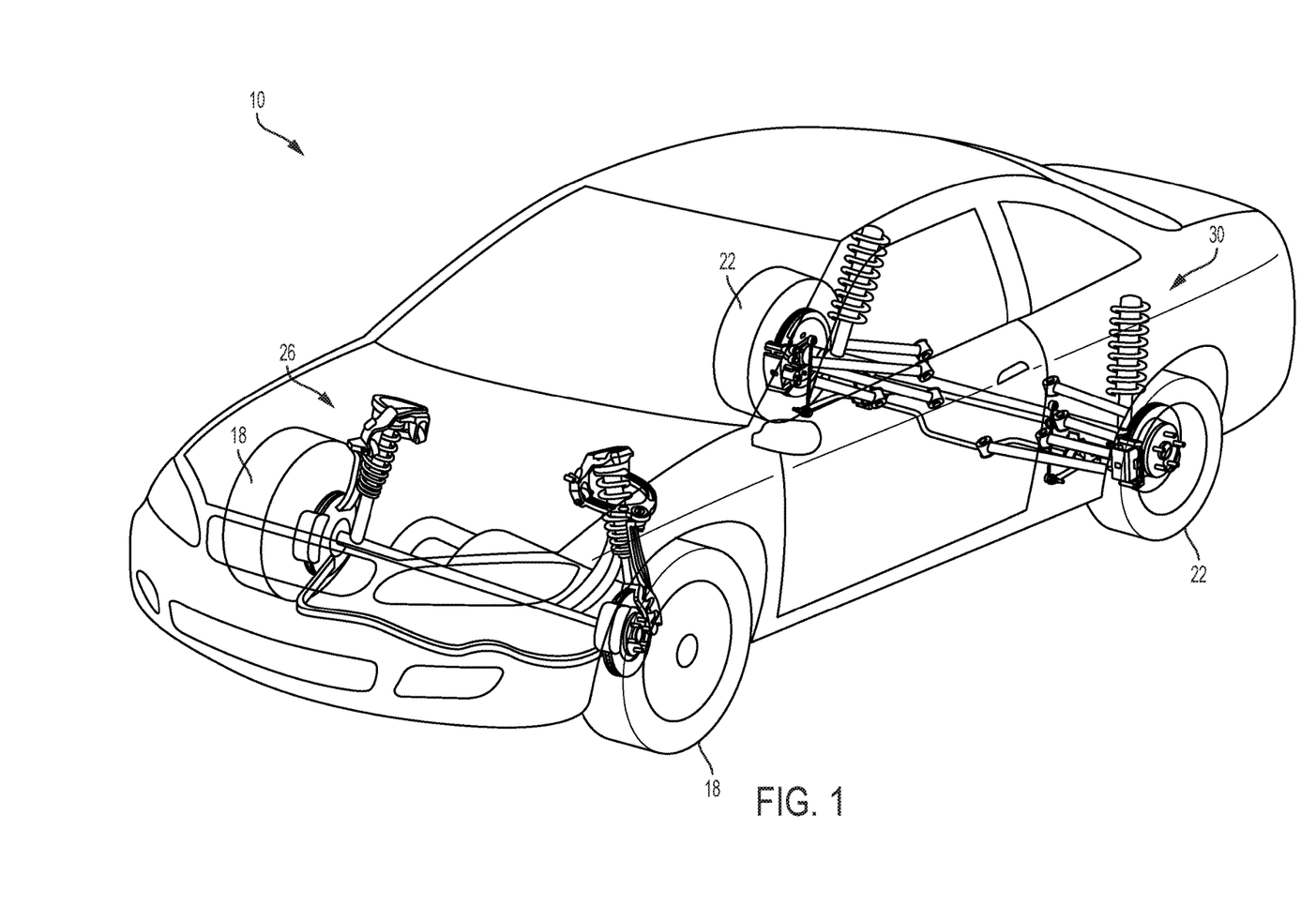
FIG. 1 is a perspective view of a vehicle including a front suspension system and a rear suspension system.

FIG. 1 illustrates a vehicle 10. The illustrated vehicle 10 is a car, but may alternatively be a truck, motorcycle, scooter, ATV, snowmobile, lawnmower, and the like. The vehicle 10 includes a chassis 14 (FIG. 2), or frame, and a plurality of wheels 18, 22. The vehicle also includes a front suspension system 26 for supporting the front wheels 18, and a rear suspension system 30 for supporting the rear wheels 22. The suspension systems 26, 30 are shown disproportionately in FIG. 1 to facilitate illustration. It should be readily apparent that the illustrated suspension systems 26, 30 are merely representative suspension systems, and other types or arrangements of suspension systems may alternatively be used with the vehicle 10.

Figure 2:
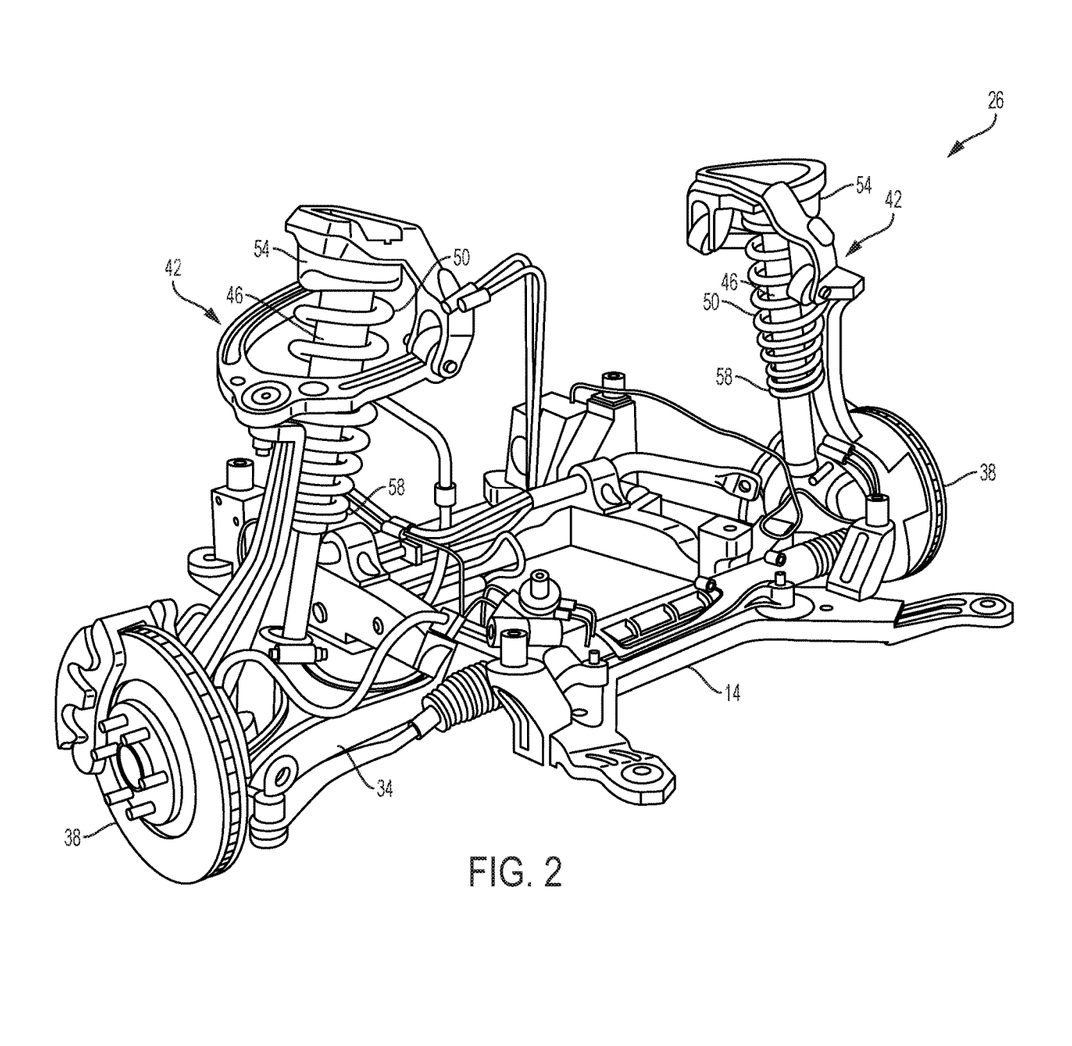
FIG. 2 is a perspective view of the front suspension system of the vehicle.

FIG. 2 illustrates the front suspension system 26 in more detail. The illustrated front suspension system 26 includes two control arms 34, two wheel hubs 38, and two damper assemblies 42. The control arms 34 are pivotally coupled to the vehicle chassis 14. The wheel hubs 38, or brake rotors, are mounted to ends of the control arms 34. The wheel hubs 38 rotatably support the front wheels 18. The damper assemblies 42 extend between the control arms 34 and the vehicle chassis 14. In the illustrated embodiment, each damper assembly 42 includes a strut 46 and a coil spring 50 positioned around the strut 46. Each coil spring 46 extends between a first, or upper, spring seat 54 and a second, or lower, spring seat 58. The upper spring seats 54 are fixed to the vehicle chassis 14. The lower spring seats 58 are fixed to lower portions of the struts 46 and, thereby, supported by the control arms 34. In other embodiments, other suitable damper assemblies may also or alternatively be employed.

Figure 3:
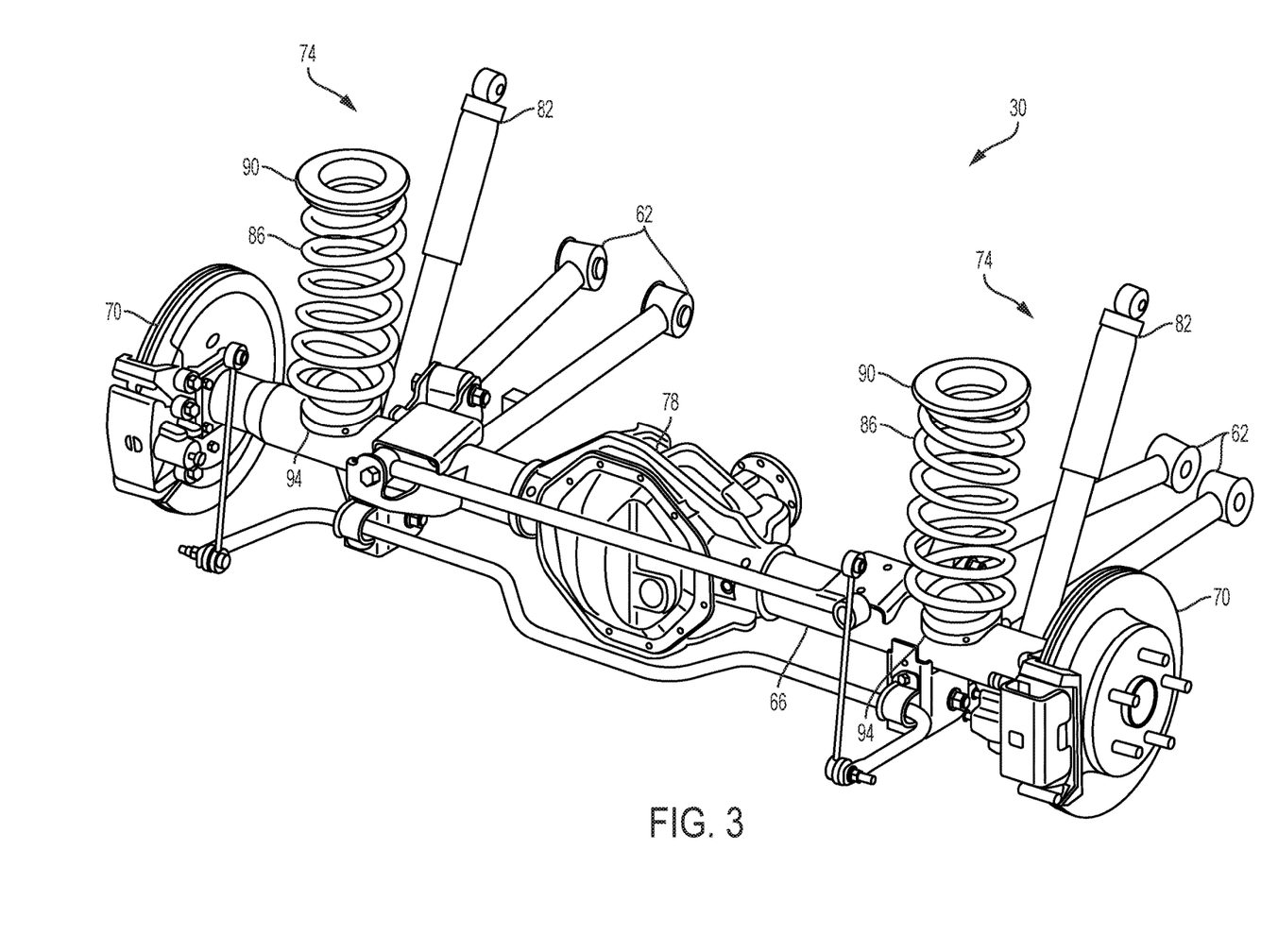
FIG. 3 is a perspective view of the rear suspension system of the vehicle.

FIG. 3 illustrates the rear suspension system 30 in more detail. In the example illustrated, the rear suspension system 30 includes four control arms 62, an axle 66, two wheel hubs 70, and two damper assemblies 74. The control arms 62 are pivotally coupled to the vehicle chassis 14. The axle 66 is supported by the control arms 62 and includes a differential 78. The axle 66 is, thereby, also moveable relative to the chassis 14. The wheel hubs 70, or brake rotors, are mounted to ends of the axle 66. The wheel hubs 70 rotatably support the rear wheels 22. The damper assemblies 74 extend between the axle 66 and the vehicle chassis 14. In the illustrated embodiment, each damper assembly 74 includes a shock absorber 82 and a coil spring 86 that is spaced apart from (i.e., does not surround) the shock absorber 82. Each coil spring 86 extends between a first, or upper, spring seat 90 and a second, or lower, spring seat 94. The upper spring seats 90 are fixed to the vehicle chassis 14. The lower spring seats 94 are fixed to the axle 66 and, thereby, supported by the control arms 62. In other embodiments, other suitable damper assemblies may also or alternatively be employed.

Figure 4:
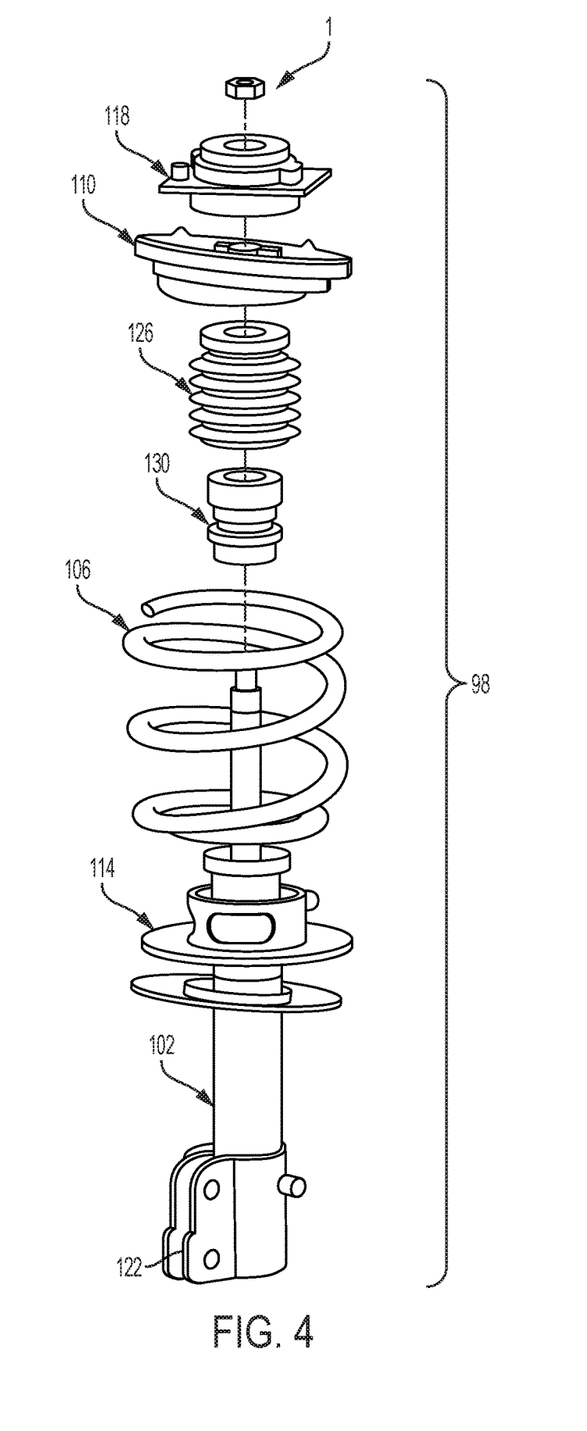
FIG. 4 is an exploded view of a conventional damper assembly for use with the front suspension system or the rear suspension system.

FIG. 4 illustrates a conventional damper assembly 98. The damper assembly 98 is similar to the damper assemblies 42 shown in FIG. 2. The illustrated damper assembly 98 includes a strut 102, a coil spring 106, an upper spring seat 110, and a lower spring seat 114. The damper assembly 98 also includes an upper mount 118 for connecting the damper assembly 98 to a vehicle chassis, and a lower mount 122 for connecting the damper assembly 98 to a control arm or an axle. In the illustrated embodiment, the damper assembly 98 further includes a jounce bumper 126 and a dust shield 130.

Figure 5:
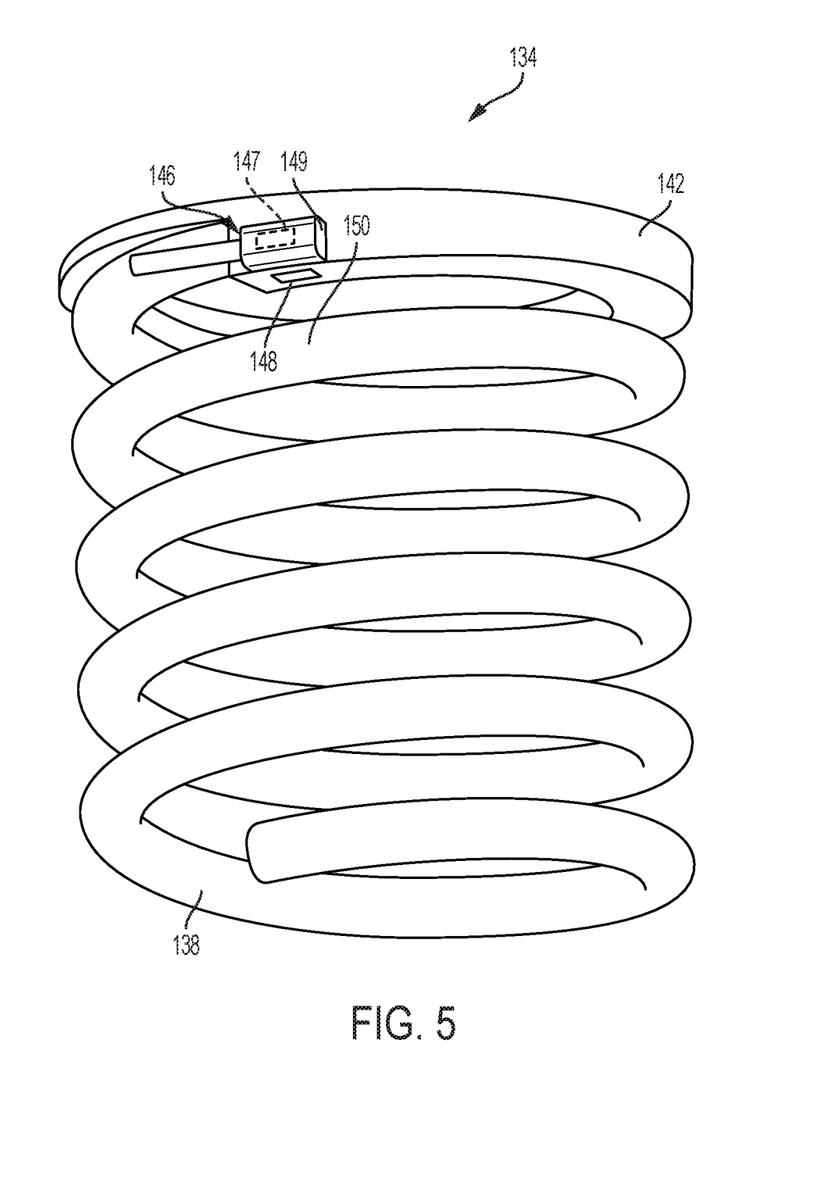
FIG. 5 is a perspective view of a portion of a damper assembly according to one embodiment of the invention, the damper assembly including a coil spring, a spring seat, and a sensor module.
Figure 6:
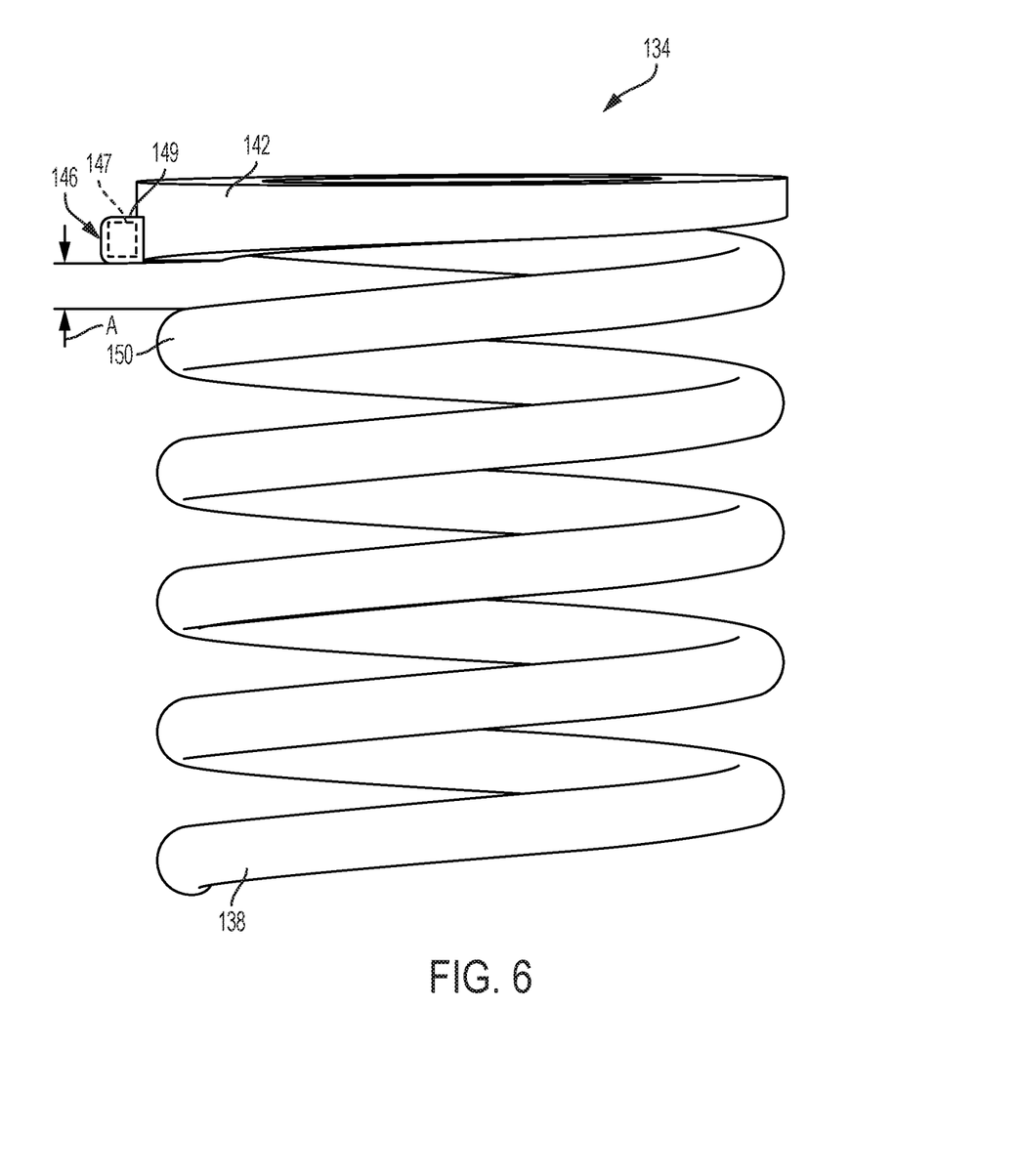
FIG. 6 is a side view of the portion of the damper assembly shown in FIG. 5.

FIGS. 5 and 6 illustrate a portion of a damper assembly 134 that is modified in accordance with embodiments of the invention. Similar to the conventional damper assembly 98, the modified damper assembly 134 includes a coil spring 138 and a spring seat 142. The spring seat 142 may be the upper spring seat or the lower spring seat of the damper assembly 134. In this description, the spring seat 142 is the part of the damper assembly 134 coupled to an end of the spring 138. In the example illustrated, the damper assembly 134 further includes a sensor module 146 supported by the spring seat 142. As will described in greater detail below, in certain embodiments the sensor module 146 is configured to determine a state of compression of the coil spring 138. The state of compression is the amount that the coil spring 138 is compressed from its relaxed state. In the illustrated embodiment, the spring seat 142 is made of a plastic or rubber material, and at least a portion of the sensor module 146 is molded into the spring seat 142. In other embodiments, the sensor module 146 may be mounted to, carried on, or otherwise embedded in the spring seat 142.

In one exemplary embodiment, the sensor module 146, or sensing system, includes a magnetic sensor 147 and a permanent magnet 148. The magnetic sensor 147 and the permanent magnet 148 are coupled to a housing 149 of the sensor module 146. In some embodiments, the magnetic sensor 147 and/or the permanent magnet 148 may be positioned within the housing 149. In other embodiments, the magnetic sensor 147 and/or the permanent magnet 148 may be mechanically connected to an outer surface of the housing 149.

The magnetic sensor 147 may be in the form of an integrated circuit. In addition, the magnetic sensor 147 may be a Hall effect sensor and, preferably, a linear Hall effect sensor. In one example, the permanent magnet 148 is embedded in the spring seat 142 adjacent the Hall effect sensor. The permanent magnet 148 faces a first coil 150 of the coil spring 138 (i.e., the portion of the spring 138 nearest to the spring seat 142 in the vertical direction shown in FIG. 6). As the coil spring 138 is compressed, the coil 150 moves closer to the permanent magnet 148, changing the magnetic field of the magnet 148 and the flux density measured through the Hall effect sensor. That is, the permanent magnet 148 interacts with the coil 150 to measure a gap A between the sensor module 146 and the coil 150. The size of the gap A is equal to a pitch distance of the coil spring 138. As the coil 150 moves closer to the magnet 148 (i.e., as the spring 138 is compressed), the magnetic flux through the Hall effect sensor increases. As the coil 150 moves further away from the magnet 148 (i.e., as the spring 138 relaxes or is extended), the magnetic flux through the Hall effect sensor decreases. In other words, the magnetic field at the Hall effect sensor changes when the compression of the spring 138 changes. In some embodiments, the gap A may range in size from about 1 mm to about 9 mm. In other embodiments, the sensor module 146 may be tuned for larger or smaller gap sizes.

The Hall effect sensor outputs a signal indicative of the magnetic flux caused by the permanent magnet 148 and the coil 150. The signal can be, for example, an analog signal, a pulse-width modulated (PWM) signal, or a single edge nibble transmission (SENT) signal. Other signal formats may also be possible. The signal can be conditioned and processed to determine a size of the gap A between the sensor module 146 and the coil 150. The size of the gap A is correlated to the state of compression of the coil spring 138. Correlation of the magnetic flux to the gap size and the state of compression of the coil spring 138 may be performed by the sensor module 146 itself or by a processor coupled to the sensor module 146. The sensor module 146 may be connected to other electronics of the vehicle 10 through, for example, a wiring harness or pigtail connector.

In other embodiments, the sensor module 146 may include another type of magnetic sensor, such as a magnetoresistive sensor, which measures the angle of a magnetic field. In such embodiments, the permanent magnet 148 and the sensor within the sensor module 146 are oriented such that the angle of the magnetic field at the sensor changes as the gap A between the coil 150 and the sensor module 146 changes (e.g., as the coil spring 138 compresses and/or extends).

In some embodiments, one sensor module 146 may be positioned at each wheel 18, 22 of the vehicle 10, corresponding to the four corners of the vehicle 10. In such embodiments, the sensor modules 146 may be used to determine the corner heights of the vehicle 10 by measuring the state of spring compression at each wheel 18, 22. The corner heights can then be compared to one another to determine the vehicle state of level.

Among other advantages and improvements, the illustrated sensor module 146 provides a relatively small sensor package that fits on a spring seat of a damper assembly. In addition, the sensor module 146 has a relatively low mass so it does not significantly alter the spring properties of the damper assembly. The sensor module 146 also provides a cost reduction over existing sensors because no additional brackets, arms, links, or rods are required to connect the sensor module 146 to the damper assembly. Furthermore, the sensor module 146 does not contact and, thereby, interfere with the operation of any other components of the damper assembly.

Various features and advantages of the invention are set forth in the following claims.

What is claimed is:

1. A damper assembly for a vehicle, the vehicle having a chassis and a control arm moveably coupled to the chassis, the damper assembly comprising:
   a first spring seat configured to be fixed to the chassis;
   a second spring seat configured to be supported by the control arm;
   a coil spring extending between the first spring seat and the second spring seat; and
   a sensor module supported by the first spring seat or the second spring seat, the sensor module being operable to determine a state of compression of the coil spring;
   wherein the sensor module includes a Hall effect sensor and a permanent magnet, and
   wherein the permanent magnet interacts with a coil of the coil spring.

2. The damper assembly of claim 1, wherein the sensor module measures a gap between a first coil of the coil spring and the sensor module.

3. The damper assembly of claim 2, wherein the permanent magnet faces the first coil of the coil spring, and wherein the sensor module senses a magnetic field generated by the permanent magnet to measure the gap.

4. The damper assembly of claim 3, wherein the sensor module senses a first magnetic flux when the gap is a first size, and wherein the sensor module senses a second magnetic flux that is greater than the first magnetic flux when the gap is a second size that is less than the first size.

5. The damper assembly of claim 1, wherein at least a portion of the sensor module is molded into the first spring seat or the second spring seat.

6. The damper assembly of claim 1, wherein the permanent magnet is embedded in the first spring seat or the second spring seat.

7. The damper assembly of claim 1, further comprising a strut configured to be supported by the control arm, wherein the second spring seat is fixed to the strut.

8. The damper assembly of claim 7, wherein the coil spring is positioned around the strut.

9. The damper assembly of claim 1, wherein the second spring seat is configured to be fixed to an axle that is supported by the control arm.

10. A suspension system for a vehicle, the suspension system comprising:
   a first control arm configured to be pivotally coupled to a chassis of the vehicle;
   a second control arm configured to be pivotally coupled to the chassis of the vehicle;
   a first wheel hub supported by the first control arm;
   a second wheel hub supported by the second control arm; and
   a damper assembly including
      a first spring seat configured to be fixed to the chassis of the vehicle,
      a second spring seat supported by the control arm,
      a coil spring extending between the first spring seat and the second spring seat, and
      a sensor module supported by the first spring seat or the second spring seat, the sensor module being operable to determine a state of compression of the coil spring;
   wherein the sensor module measures a gap between a first coil of the coil spring and the sensor module.

11. The suspension system of claim 10, wherein the sensor module includes a magnet facing the first coil of the coil spring, and wherein the sensor module senses a magnetic field generated by the magnet to measure the gap.

12. The suspension system of claim 11, wherein the sensor module senses a first magnetic flux when the gap is a first size, and wherein the sensor module senses a second magnetic flux that is greater than the first magnetic flux when the gap is a second size that is less than the first size.

13. The suspension system of claim 10, wherein at least a portion of the sensor module is molded into the first spring seat or the second spring seat.

14. The suspension system of claim 10, wherein the damper assembly further includes a strut supported by the control arm, wherein the coil spring is positioned around the strut, and wherein the second spring seat is fixed to the strut.

15. The suspension system of claim 10, further comprising an axle supported by the first and second control arms and supporting the first and second wheel hubs, wherein the second spring seat is fixed to the axle.

16. A sensing system that measures compression of a vehicle coil spring, the sensing system comprising:
   a housing configured to be coupled to an end of the coil spring;
   a permanent magnet supported by the housing, the permanent magnet having a magnetic field that interacts with a coil of the coil spring; and
   a magnetic sensor supported by the housing, the magnetic sensor being operable to sense the magnetic field from the permanent magnet;
   wherein the magnetic field at the magnetic sensor changes when the compression of the coil spring changes.

17. The sensing system of claim 16, wherein the magnetic sensor senses an increased magnetic flux as a gap between the permanent magnet and a coil of the coil spring decreases, and wherein the magnetic sensor senses a decreased magnetic flux as the gap between the permanent magnet and the coil of the coil spring increases.

18. A damper assembly for a vehicle, the vehicle having a chassis and a control arm moveably coupled to the chassis, the damper assembly comprising:
   a first spring seat configured to be fixed to the chassis;
   a second spring seat configured to be supported by the control arm;
   a coil spring extending between the first spring seat and the second spring seat; and
   a sensor module supported by the first spring seat or the second spring seat, the sensor module being operable to determine a state of compression of the coil spring;
   wherein the sensor module measures a gap between a first coil of the coil spring and the sensor module.

19. The damper assembly of claim 18, wherein the sensor module includes a magnet facing the first coil of the coil spring, and wherein the sensor module senses a magnetic field generated by the magnet to measure the gap.

20. The damper assembly of claim 19, wherein the sensor module senses a first magnetic flux when the gap is a first size, and wherein the sensor module senses a second magnetic flux that is greater than the first magnetic flux when the gap is a second size that is less than the first size.

* * * * *